United States Patent [19]

Sawa et al.

[11] 4,233,019
[45] Nov. 11, 1980

[54] APPARATUS FOR DELIVERING PARISONS OF PRESELECTED LENGTH AND DIAMETER

[75] Inventors: Yuji Sawa; Sigeru Endo, both of Iwaki, Japan

[73] Assignee: Kureha Kagaku Kogyo Kabushiki Kaisha, Tokyo, Japan

[21] Appl. No.: 933,404

[22] Filed: Aug. 14, 1978

[30] Foreign Application Priority Data

Aug. 24, 1977 [JP] Japan .................... 52-100566

[51] Int. Cl.³ .................... B29C 17/07; B29C 17/16
[52] U.S. Cl. .................... 425/305.1; 264/532; 264/543; 425/340; 425/529; 425/531; 425/534
[58] Field of Search ............. 425/529, 531, 532, 534, 425/538, 540, 305.1, 340; 264/532, 543

[56] References Cited

U.S. PATENT DOCUMENTS

| 3,596,315 | 8/1971 | Yoshikawa et al. ............ 425/540 X |
| 3,872,203 | 3/1975 | Yoshikawa et al. ............ 264/532 |

Primary Examiner—Jan H. Silbaugh
Attorney, Agent, or Firm—Sughrue, Rothwell, Mion, Zinn & Macpeak

[57] ABSTRACT

The present invention relates to a method and apparatus for simultaneously cutting and supporting an extruded parison by an upper and lower pair of chucks, and for stretching by a preselected amount the cut parison supported between the upper and lower pair of chucks as the cut parison is delivered to a mold, whereby the cut parison is of a preselected length and outer diameter when it is delivered to the mold.

7 Claims, 6 Drawing Figures

APPARATUS FOR DELIVERING PARISONS OF PRESELECTED LENGTH AND DIAMETER

BACKGROUND OF THE INVENTION

1. Field of the Invention

The present invention relates to a method and apparatus for simultaneously cutting and supporting a parison by an upper and lower pair of chucks so as to obtain a predetermined length thereof, and for stretching longitudinally the cut parison as the parison is delivered to a mold.

2. Description of the Prior Art

Conventionally, in molten blow molding using a molten-state tubular member made of synthetic resin (hereinafter referred to as "parison"), a parison is provided by an extruding die having a substantially circular opening so as to produce a parison having a hollow cylindrical shape. Typically, the outer diameter of the parison must be less than the inner diameter of the mold. Thus, in the case of a bottle having a small diameter portion, the outer diameter of the parison must be very small. Such a small diameter is difficult to achieve, however, particularly because the diameter of the extruded parison increases due to the high pressure differential between the interior and exterior of the extruding die, etc. This unwanted swelling in the diameter of the extruded parison becomes more and more noticeable as the speed of extrusion is increased.

In view of this swelling problem, the extruded parison outer diameter is reduced by stretching the parison during the time it is moved from the extruder to the blow mold. One conventional apparatus using the stretching is a molding device of the vertically rotary type provided with molds arranged such that the base portions of each mold continuously are confronted with each other, or the molds are circumferentially disposed in parallel with extruded parisons. Another conventional apparatus using stretching is of the so-called "caterpillar type" molding device having molds disposed in oval rotaries and the extruded parisons are stretched during molding when two rotaries are confronted with each other at linear portions thereof. According to these two methods, the extruded parison diameter is reduced by holding and stretching the parison by means of a mold whose rotating speed is higher than the parison extruding speed. However, noticeable drawbacks are present because the longitudinal size of the mold is restricted and diameter reduction may be small if the mold size is small, resulting in restricting the length of the parison because the molds are arranged in a longitudinal direction. On the other hand, a conventional horizontal rotary type molding device is provided having molds which are vertically and circumferentially disposed. The parisons are downwardly and vertically extruded from the extruder and are directly held by a rotating mold. In such apparatus, however, the parison diameter increases, and it is difficult to perform blow molding for small diameter portions of the bottle without cutting the parison.

SUMMARY OF THE INVENTION

It is therefore an object of the present invention to overcome the above-mentioned drawbacks and disadvantages and to provide an improved method and apparatus for continuously cutting, stretching and delivering a parison.

Briefly, and in accordance with the present invention, a vertically extruded parison is cut to a predetermined length and supported by upper and lower pair of chucks, and the lower chuck is then downwardly moved to stretch the parison to obtain a parison of small diameter as the parison is delivered to the mold, whereby a parison having a small diameter can be obtained which is suitable for molding, for example, a bottle having small diameter.

A rotary member is continuously horizontally rotated between an extruder and a mold, and a plurality of upper and lower chuck units are disposed along the circumference of the rotary member to cut and support the parison. The upper chucks are maintained at a constant level, while the lower chucks are vertically movable by the slanted surface of a guide cam member and a control cam member both concentric with the rotary member so as to stretch the parison axially during rotation of the rotary member and to deliver it to the mold.

DETAILED DESCRIPTION OF THE INVENTION

The present invention is now described in detail with reference to the accompanying drawings.

Parison, as referred to herein, designates a tubular member made of a synthetic resin which is directly blow molded witin a mold when in the molten state. As is apparent, the parison has a smaller diameter than the diameter of the final product produced by the blow molding process.

Figure 1:
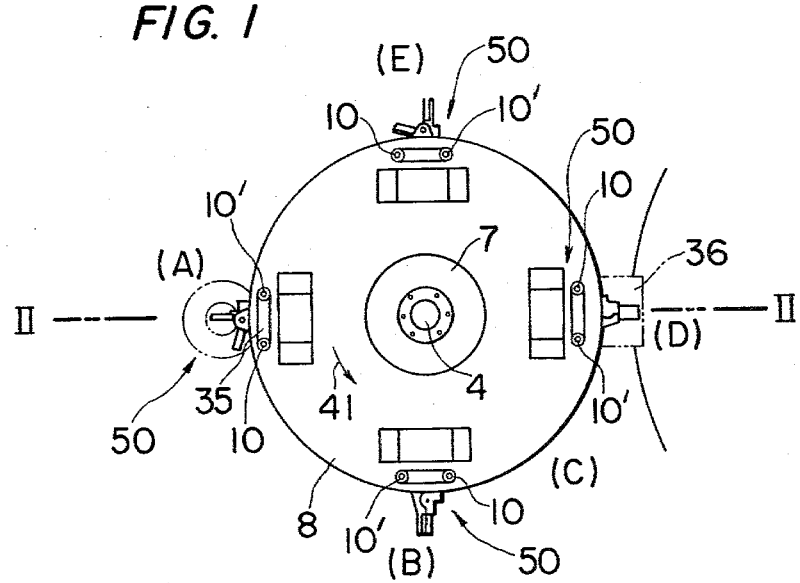
FIG. 1 is a top plan view of the parison delivering device according to the present invention.
Figure 2:
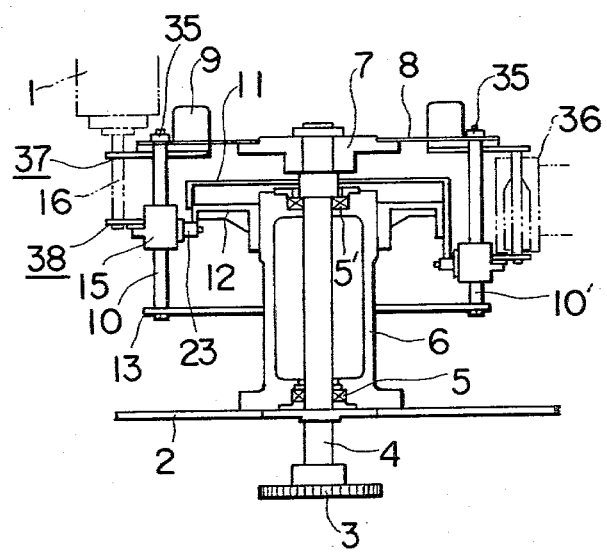
FIG. 2 is a side view partially in cross section taken along line II—II of FIG. 1 of the parison delivering device of the present invention.
Figure 3:
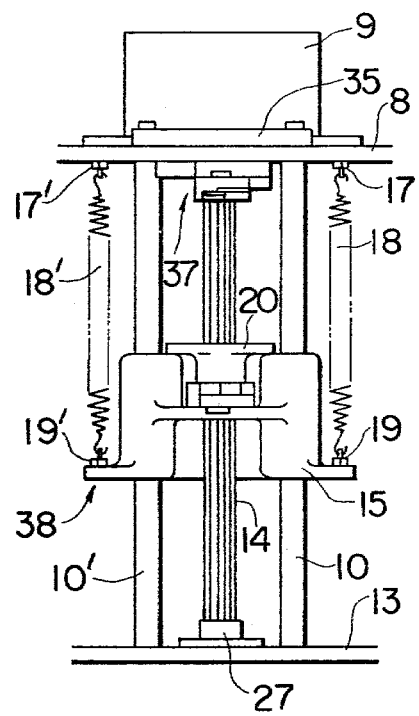
FIG. 3 is an enlarged side view of the chuck portion shown in FIG. 2 according to the present invention.

As shown in FIGS. 1 and 2, the parison delivering apparatus of the present invention is of a rotary type, wherein a rotary shaft 4 is supported by bearings 5, 5' fixed to a frame 6. Frame 6 is mounted on a table 2. The shaft 4 is rotated by a gear 3 integrally attached thereto. A flange 7 is fixed to the upper portion of the rotary shaft 4. An upper plate 8 is fixed to flange 7.

As shown in FIG. 1, a plurality of chuck units 50 are disposed on the upper plate 8 at equal intervals such as, for example, at 90° arc intervals. Each of the four chuck units 50 is provided with a pair of guide shafts 10, 10'. Each guide shaft 10, 10' connects the upper plate 8 with a ring-shaped lower plate 13 through a member 35. Thus, when the rotary shaft 4 is rotated, the upper plate 8, guide shafts 10, 10' and the lower plate 13, are all rotated about shaft 4.

An explanation is presented for each of the four chuck units 50 circumferentially disposed on the upper plate 8. Each chuck unit 50 serves to cut the parison 16 provided by a die 1 to a predetermined length, serves to support and stretch the parison 16, and serves to deliver the parison 16 to a mold 36 as the shaft 4 is rotated 180°, for example. Each chuck unit 50 consists of an upper chuck 37 and a lower chuck 38, as shown in detail in FIGS. 3 through 6. The upper plate 8 is provided with a rotation unit 9 for rotating a shaft 24, as shown in FIG. 4, in a normal direction or reversal direction on command within a preselected angle by switching an inlet opening by means of a solenoid valve or the like (not shown) for introducing compressed air to rotation unit 9.

Figure 4:
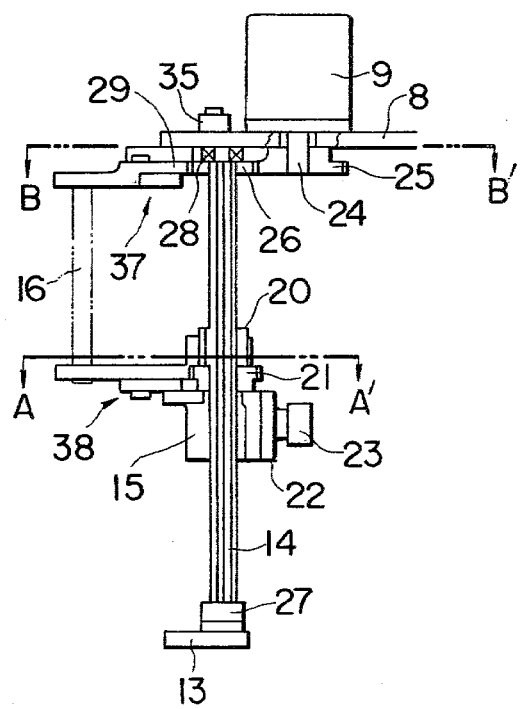
FIG. 4 is an alternate side view of the chuck portion of FIG. 3.
Figure 6:
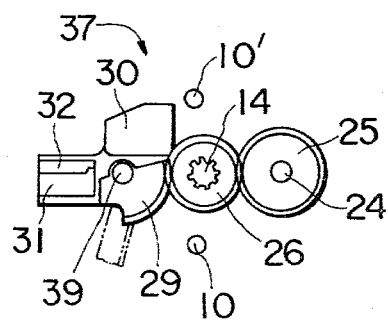
FIG. 6 is a plan view of the upper chuck taken along line B—B' of FIG. 4.

The shaft 24 is provided with a gear 25 which engages a gear 26, which, in turn, engages a movable chuck 29, as shown in FIGS. 4 and 6. The center of gear 26 is fixedly secured to a spline shaft 14 having one end rotatably supported by a bearing 28 and having the other end rotatably supported by a bearing 27 mounted on lower plate 13, so that the movable chuck 29 is rotated about a pin 39 and the spline shaft 14 is rotated by the rotation of the shaft 24, as shown best in FIG. 6. A stationary chuck 30 of the upper chuck 37 is fixed to upper plate 8, and pin 39 is fixed to chuck 30. Chuck 30 and 29 are provided with cutters 32 and 31, respectively, to cut and hold the parison by the opening and closing of the upper chuck 37.

Figure 5:
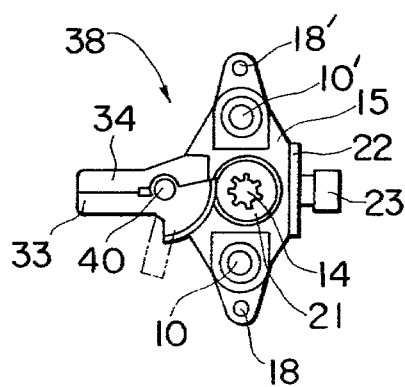
FIG. 5 is a plan view of the lower chuck taken along line A—A' of FIG. 4.

On the other hand, in the lower chuck 38, as shown in FIG. 5, a movable body 15 is slidably supported on the guide shafts 10, 10', which connect the upper plate 8 to the lower plate 13. Hooks 17, 17' are fixed to the upper plate 8. In addition, hooks 19, 19' are fixed to the movable body 15. Tensile springs 18, 18' are connected between hooks 17, 17' and hooks 19, 19', respectively, so as to urge normally movable body 15 towards upper plate 8. Between movable body 15 and a stopper 20 integral therewith, is a gear 21 supported by spline shaft 14. Gear 21 is in rotational engagement with a movable chuck 33 of lower chuck 38. The movable body 15 also includes a fixed chuck 34 having a pin 40 about which movable chuck 33 is rotated.

A roller support 22 is provided in the movable body 15 for supporting roller 23, so as to allow the movement of the entire lower chuck mechanism 38, as shown in FIG. 5. As shown in FIG. 2, a guiding cam 11, and preferably a controlling cam 12, is fixedly supported by the frame 6. The lower chuck 38 is urged upwardly by the biasing force of springs 18, 18' to permit close contact of the roller 23 with the lower surface of the guide cam 11. Thus, the position of the lower surface of guide cam 11 determines the distance between the upper chuck 37 and the lower chuck 38. Guide cam 11 is cylindrical in shape and the lower surface in rotational contact with roller 23 causes the respective lower chuck 38 to be moved towards table 2 as the associated chuck unit 50 is rotated between the extruding die 1 and the mold 36. Thus, the position of roller 23 is furthest from the upper chuck 37 when the roller 23 reaches the position at which the parison 16 is transferred to the mold 36 so as to obtain a predetermined distance between upper and lower chucks 38, 37 suitable for delivering the parison 16 to mold 36.

A controlling cam 12, as shown in FIG. 2, can be provided if desired along with guide cam 11. Such a controlling cam 12 is movably secured to guide cam 11 and allows the distance between the upper chuck 37 and lower chuck 38 to be preselected at the rotational position of the associated chuck unit 50 where the parison 16 is cut from the extruding die 1 by the upper chuck 37. Guiding cam 11 is vertically movable in accordance with the size of the mold 36. It should be noted that the cams 11, 12 determine the amount of stretching of the parison 16 before it is inserted into the mold 36.

The operation of the parison delivering apparatus of the present invention is now described. For purposes of explanation, five positions in the counter clockwise rotation of upper plate 8 have been designated by reference letters A to E, respectively, as shown in FIG. 1. Position A designates the position where a respective chuck unit 50 is adjacent the extruding die 1 for providing the uncut parison 16. In comparison, position D designates the position where a respective chuck unit 50 is adjacent the mold 36 for providing a cut and stretched parison 16 to the mold 36. As shown by arrow 41, shaft 4 is rotated so that upper plate 8 is rotated counterclockwise.

When the respective chuck unit 50 reaches position A due to the counterclockwise rotation of upper plate 8, the rotation unit 9 is provided by the solenoid (not shown) with drive power causing shaft 24 to be rotated. The rotation of shaft 24 causes the upper movable chuck 29 and the lower movable chuck 33, associated with the respective chuck unit 50, to be rotated from the open positions b, d, to the closed positions. The rotation of movable chucks 29, 33 causes the uncut parison 16 provided by extruding die 1 to be cut therefrom by movable chuck 29 and then to be held between upper chuck 37 and lower chuck 38. As stated above, once the parison 16 has been cut from the extruding die 1, controlling cam 12 can provide immediate stretching of the cut parison 16 held between upper chuck 37 and lower chuck 38 by moving lower chuck 38 away from upper chuck 37.

As the upper plate 8 rotates the respective chuck unit 50 from position A to position D through positions B and C, the parison 16 held between upper chuck 37 and lower chuck 38 is stretched before being inserted into the mold 36 to the desired length by the controlled movement of lower chuck 38 away from upper chuck 37 due to the sliding contact of roller 23 with the lower surface of guide cam 11. When the respective chuck unit 50 reaches the position D, the mold 36 is inserted between the upper chuck 37 and the lower chuck 38 adjacent the parison 16 held therebetween. Then a solenoid (not shown) provides drive power to the rotational unit 9 causing shaft 24 to be rotated such that chucks 29 and 33, associated with the respective chuck unit 50, are rotated from the closed positions to the open positions whereby the parison 16 is released into the mold 36 adjacent thereto.

The above-described operation of the parison delivery apparatus of the present invention is continuously carried out by a plurality of chuck units 50 circumferentially disposed on the upper plate 8 so that it is possible to cut continuously the extruded parisons 16 to predetermined lengths and to stretch the cut parison 16 during the transfer of the cut parisons 16 to the molds 36. Even if the size of the molds 36 is changed, it is possible to use the present invention to provide cut parisons 16 of preselected length to the molds 36 by regulating the positional relationship between guide cam 11 and control cam 12.

What is claimed is:
1. An apparatus for delivering a parison from a die of an extruder to a molding means comprising:
(a) a rotary member supported by a rotation shaft, said rotary member being rotated in a horizontal plane between said die and said molding means by rotation of said rotary shaft;
(b) a plurality of upper chuck means disposed around the circumference of said rotary member for cut- ting and securing said parison extruded from said die when closed and for releasing said parison when opened, each said upper chuck means provided with a cutter;

(c) an equal plurality of lower chuck means, each said lower chuck means being associated with one of said upper chuck means and vertically slidable with respect to said associated upper chuck means in synchronism with said rotation of said rotary member for securing and stretching said parison when closed and for releasing said stretched parison when opened;

(d) a stationary cylindrical guide cam member adjacent said rotary shaft and in rotational contact with each said lower chuck means for causing each said lower chuck means to move away from each associated upper chuck means as each said associated lower chuck means and upper chuck means are rotated by said rotary member between said die and said molding means; and (e) said rotary member including an upper plate fixed to said rotary shaft, a lower ring-like plate disposed around said rotary shaft, a plurality of pairs of guide shafts disposed between said upper and lower plates for slidingly supporting said lower chuck means for movement toward and away from said upper chuck means, an equal plurality of rotatable spline shafts disposed between said upper and lower plates, each of said rotatable spline shafts disposed between said upper and lower plates, each of said rotatable spline shafts being adjacent an associated pair of said guide shafts and coupled to the upper and lower chuck means supported by said associated pair of guide shafts, and means for rotating said spline shafts to open and close said upper and lower chuck means.

2. The apparatus as recited in claim 1, wherein said plurality of associated upper chuck means and lower chuck means are disposed on said rotary member at substantially equal arc intervals.

3. The apparatus as recited in claim 1, wherein each of said plurality of upper chuck means comprises, an upper stationary chuck having a cutter provided on said upper plate, and an upper movable chuck having a cutter and pivotally mounted for sliding cutting engagement with said cutter of said stationary chuck, said upper movable chuck being in gear engagement with said associated rotatable spline shaft to provide pivotal movement thereto.

4. The apparatus as defined in claim 1, wherein each of said plurality of lower chuck means comprises,
 (a) a movable body slidably supported on a pair of said guide shafts,
 (b) a stationary lower chuck extending from said movable body,
 (c) a movable lower chuck pivotally mounted to said stationary chuck and in gear engagement with said associated rotatable spline shaft,
 (d) a roller extending from said movable body, said roller being in sliding contact with said cylindrical guide cam member, and
 (e) a pair of springs, each of said springs having one end connected to said movable body and the other end connected to said upper plate for urging said movable body towards said associated upper chuck means.

5. The apparatus as defined in claim 1, wherein a lower end surface of said guide cam member is slanted to function as a cam surface, said cam surface being closest said upper chuck means at a position adjacent said die and furthest said upper chuck means at a position adjacent to said molding means.

6. The apparatus as defined in claim 1, further comprising a cylindrical control cam member concentrically provided with said guide cam member to selectively control the minimum distance between said associated upper chuck means and lower chuck means.

7. The apparatus as defined in claim 1, wherein said means for rotating said spline shafts comprises a plurality of rotational units provided on said upper plate, one of said rotational units provided adjacent each of said pairs of guide shafts and in gear engagement with said associated spline shaft to change selectively the rotation direction thereof.

* * * * *